J. D. SMITH.
Wheel Cultivator.
No. 42,514. Patented Apr. 26, 1864.
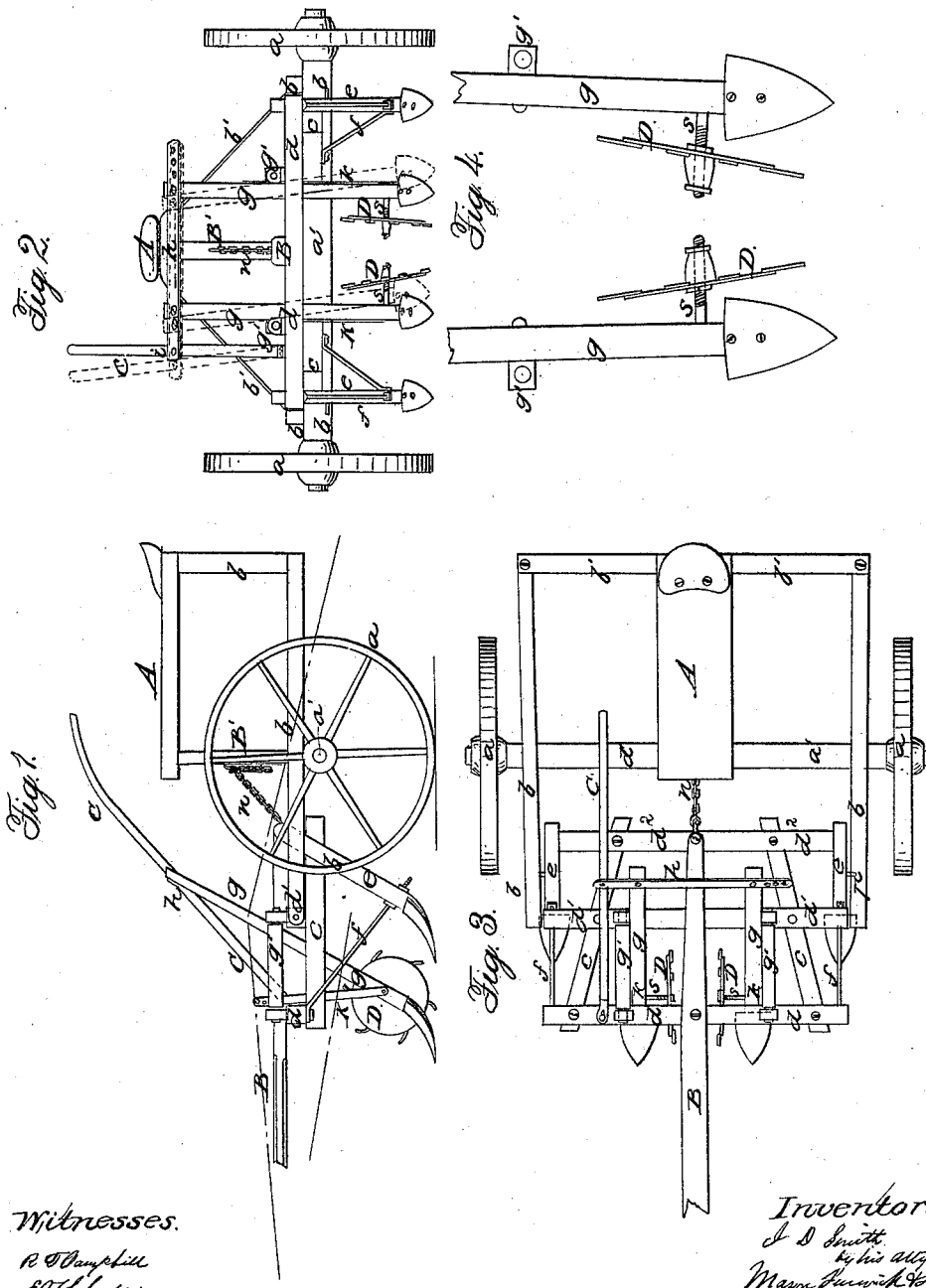
Witnesses.
Inventor.

UNITED STATES PATENT OFFICE.

J. D. SMITH, OF PEORIA, ILLINOIS.

IMPROVEMENT IN CULTIVATORS.

Specification forming part of Letters Patent No. 42,514, dated April 26, 1864.

*To all whom it may concern:*

Be it known that I, J. D. SMITH, of Peoria, Peoria county, State of Illinois, have invented a new and Improved Corn-Cultivator; and I do hereby declare that the following is a full, clear, and exact description thereof, reference being had to the accompanying drawings, making a part of this specification, in which—

Figure 1 is a side elevation of the improved cultivator. Fig. 2 is a front view of the machine. Fig. 3 is a top view of same. Fig. 4 is a front view of the forward shovels, showing the rotating guards applied to their standards.

Similar letters of reference indicate corresponding parts in the several figures.

The object of my invention is to construct a wheel corn-cultivator in such manner that the driver shall have a better opportunity for guiding and directing the shovels between the rows of corn, and at the same time managing his team, than in machines of this kind hitherto used; also, to afford the driver greater facility for regulating the depth he desires to run his shovels and for throwing the same entirely off the ground; and, finally, to prevent clods of earth from being thrown upon the young plants by the shovels, all of which will be hereinafter described.

To enable others skilled in the art to make and use my invention, I will describe its construction and operation.

In the accompanying drawings, $a\ a$ represent the carriage-wheels, which support the shovel-frame and the driver's seat; and $a'$ is the axle-tree of these wheels, extending longitudinally across which are two beams, $b\ b$, that are bolted rigidly to the axle-tree and braced by means of the rear supports, $b'\ b'$, of the driver's seat A, and also by means of the central or intermediate rocking beam of the shovel-frame. These beams $b\ b$ should extend farther in rear of the axle than they do in front thereof, in order to admit of the use of a long seat, A, for the driver, so that he can raise the plows or shovels entirely from the ground by moving to the rear of this seat, the beams $b\ b$ in this case serving as levers, of which the axle $a'$ is their fulcrum.

The shovel-frame consists of three or more transverse beams, securely braced together at proper distances apart by the under braces, $c$ $c$, and also the tongue or pole B, which latter is on top of the frame and at an intermediate point between the ends thereof. The middle beam, $d'$, of this frame is attached at its ends by pivots to the forward ends of the two beams $b\ b$, so that this frame will oscillate thereon. The rearmost beam, $d^2$, is somewhat shorter than the forward beams, $d\ d'$, and to the ends of this beam $d^2$ the two rear shovel-standards, $e\ e$, are attached and suitably braced by the rods $f f$. The forward shovel-standards, $g\ g$, are considerably longer than the rear standards, and these standards $g\ g$ are bolted rigidly to rocking bars $g'\ g'$, which have their pivot-bearings in blocks projecting from the upper surfaces of the two beams $d\ d'$, as shown in Figs. 1, 2, and 3. The upper ends of these shovel-beams $g\ g$ are connected together by an adjustable brace-rod, $h$, which rod is also connected by a pivot, $i$, to the arm C, which is used by the driver to vibrate the two shovel-standards $g\ g$. This arm or handle C is pivoted at its forward end to the forward beam, $d$, of the shovel-frame, and extends upward and backward to a point convenient to the driver sitting on the seat A. The shovel-standards $g\ g$ are braced by the forward rods, $k\ k$, which are connected to the rocking bars $g'\ g'$, which are in this manner made to form long and substantial rocking supports for the forward shovel-standards, which resist the strain put upon the shovels.

From this description it will be seen that the forward shovels of my machine can both be moved laterally about their hinged joints, and at the same time the entire shovel-frame can be moved vertically about its hinged joint. By the former movement of the forward shovels the driver, while sitting on his seat A, can, with one hand on the arm C, direct these shovels to the right or to the left of the rows, according as the rows deviate from a straight line, and by the latter movement the driver can raise or depress the forward and rear shovels or raise them entirely off the ground.

To enable the driver to determine the depth which he desires to run the shovels, I have attached a chain, $n$, to the rear end of the draft-pole or shovel-frame, which chain is connected to a hook on the forward side of the seat-standard B', by regulating the length of this chain-connection it will check the downward movement of the rear end of the shovel-frame at the desired point, and to prevent the rear or driver's seat-frame from tilting too far backward the stops $p\ p$ on the sides of the rear shovel-standards will be brought in contact with the forward extended ends of the beams $b\ b$ when the rear ends of these beams are tilted backward to their fullest extent. The operation of the machine is in this manner and by these means so simplified that the driver can conveniently manage his team while he controls and directs the shovels along the rows of plants. To raise or depress the shovels he moves backward or forward on his long seat A, and thus brings his weight to bear either on one side or the other of the axle-tree, while at the same time he can operate the two forward shovels and control his horses, as above described.

In conjunction with the vibrating shovel-standards I use two circular rotating guard or fender plates, D D, one of which is arranged on the inside of each shovel-standard, as shown clearly in Fig. 4. These guards are applied to short axles $s\ s$, and kept in place thereon by means of nuts on each side of the guards, which nuts are screwed on their respective axles in such manner that by adjusting them the guards can be set nearer together or farther apart, according to circumstances. The spurs or hooked teeth which project from the periphery of each guard-plate skim along the surface of the hills and cause the guards to rotate and to fend off the clods of earth, which would otherwise be thrown upon the young plants by the shovels. These rotating guards will not become clogged with grass, weeds, or anything else, as the ends of the teeth are bent longitudinally to the peripheries of their respective guards, and are thus caused to leave the ground in positions perpendicular to its surface. The teeth on these rotating guards serve two purposes. They keep the guards rotating during the forward movement of the machine, and also serve to a great extent as a screen for allowing none but fine earth to be thrown about the roots of the plants. These teeth also serve to some extent as pulverizers of the earth; but their chief object is to rotate the guards, and thus to occasion as little friction as possible. These guards may be inclined from a vertical line, or they may be made to work in vertical planes.

I do not claim the combination of a front and rear frame; nor do I claim attaching the shovels to rock-shafts united so as to be operated by one lever from the driver's seat.

Having thus described my invention, what I claim as new, and desire to secure by Letters Patent, is—

1. The combination of the carriage-swinging frame $b\ b$, driver's seat A, hinged shovel-carrying frame $d$, vibrating shovel-standards $g\ g$, (connected to rock-shafts,) stop-pins $p\ p$, and adjusting-chain $n$, when the frame $d$, with the shovels, is entirely forward of the axle of the frame $b\ b$, and the standards of the shovels are connected together at their upper extended ends by an adjustable bar, $h$, and operated by the single pivoted handle C from the driver's seat, all in the manner and for the purpose herein described.

2. The arrangement of the rear wheeled frame, $b\ b$, front cultivator-frame, $d$, seat A, shovels $g$, rock-shafts $g'\ g'$, bar $h$, lever C, stop-pins $p\ p$, chain $n$, tongue B, and oblique laterally-adjustable guards D D, all for united use in a machine adapted for cultivating growing crops, as set forth.

3. The arrangement of the chain-connection $n$ and stop-pins $p\ p$, in combination with the hinged forward shovel-frame and the rear wheeled frame, when the said frames are constructed and operated in the manner herein described, and all adapted for the purpose set forth.

Witness my hand in the matter of my application for patent on improved sulky corn-cultivator this 15th day of December, 1863.

J. D. SMITH.

Witnesses:
CHAS. THOMPSON,
C. L. HENRICLE.